Dec. 19, 1933. E. HURLBRINK 1,939,899
APPARATUS FOR DELIVERING AND MEASURING LIQUIDS
Filed Nov. 22, 1932 2 Sheets-Sheet 1

Inventor:
E. Hurlbrink
By Marks & Clerk
Attys

Patented Dec. 19, 1933

1,939,899

UNITED STATES PATENT OFFICE 1,939,899

APPARATUS FOR DELIVERING AND MEASURING LIQUIDS

Ernst Hurlbrink, Berlin-Westend, Germany, assignor to firm Fabrik explosionssicherer Gefässe Salzkotten G. m. b. H., Salzkotten, Germany Application November 22, 1932, Serial No. 643,928, and in Germany December 2, 1931

10 Claims. (Cl. 221—100)

My invention relates to apparatus for delivering and measuring liquids, such as fuels and lubricating oil, of the kind, in which a piston moves to and fro in a cylinder forming the measuring spaces, which piston in its two extreme positions determines the volume of the liquid drawn in or driven out at each to and fro stroke of the piston in the measuring cylinder and directly or indirectly actuates a counting mechanism which indicates the quantity of liquid delivered. In known apparatus of this kind each end of the measuring cylinder is in communication through a connecting pipe with a change-over member, to which is also connected the pipe for the supply and the pipe for the delivery of the liquid and which is so operated that it alternately connects one of the connecting pipes leading from the change-over member to the measuring cylinder with the supply pipe and the other one with the delivery pipe and vice versa.

When interrupting the tapping operation of an apparatus of the class referred to it is of importance that as soon as the measuring piston has arrived at the end of its stroke, it will stand exactly at the mark indicating said end of the stroke and will maintain this position. Where the liquid is supplied by means of a hand-pump it is further desirable that the measuring piston after having completed a stroke will not begin the next stroke in the opposite direction too suddenly, as it would otherwise be difficult to interrupt the pumping operation exactly in the end position of the piston. For this reason it has already been proposed to retard the movement of the change-over member for a certain period, for instance for a fraction of a second of time, after the beginning of the reversion at the end of the piston stroke. By virtue of such retardation the operator is in the position to wait for the exact moment of the interruption of the pumping operation. Furthermore, in contradistinction to a momentary reversion in which through the liquid column accelerated by the pump and through the tension of the air- or gas-bubbles taken along by the accelerated liquid column the measuring piston would also, when the pumping action is momentarily arrested be forced for a certain distance backwards out of its end position, owing to the said retardation the liquid column will be brought to a dead stop and the liberation of the gas- or air-bubbles will take place with the result that the liquid column can no longer force the measuring piston out of its position of rest in the case that after the mentioned retardation the reversion of the throw-over member really will take place. The retarding device above described has several disadvantages which appear especially in apparatus with measuring cylinders of small volume such as for instance of a volume of one litre. In consequence of the retardation of the change-over member at the end of each stroke much time is lost in such apparatus relatively to the total quantity of liquid which is tapped, so that the tapping or dispensing capacity per unit of time is considerably decreased.

The said disadvantage is avoided according to my invention by providing the apparatus with a device through which the retardation of the reversing motion of the change-over member may temporarily be disposed with or through which the retarding means may temporarily be rendered inoperative. In the apparatus according to my invention this is accomplished normally during the greater part of the tapping period, whereas only at the end of a tapping period and before the measuring piston has completed its last stroke the retarding means are set into operation.

In apparatus in which the tapping period is brought to an end by closing a stop-valve provided in the supply conduit, it is preferable to connect said stop-valve operatively with the member for the cutting out of the retarding device in such a manner that the closing movement of the said stop-valve will cause the retarding device to become operative in such a manner that a short time before each closing of the stop-valve the retarding device is automatically set into operation.

According to another preferred embodiment of my invention the setting into operation of the retarding device is effected automatically in dependence on two enhancements or surges of the pressure in the tapping conduit which enhancements or surges are interrupted by a reduction of the pressure. In this way the tapping operation can be terminated by repeated throttlings or by a repeated temporary closing of the valve of the tapping hose and with the same means the ineffectiveness of the retardation device may be removed immediately before the last reversal during the respective tapping period.

My invention is illustrated by way of example in the accompanying drawings.

Figure 1:
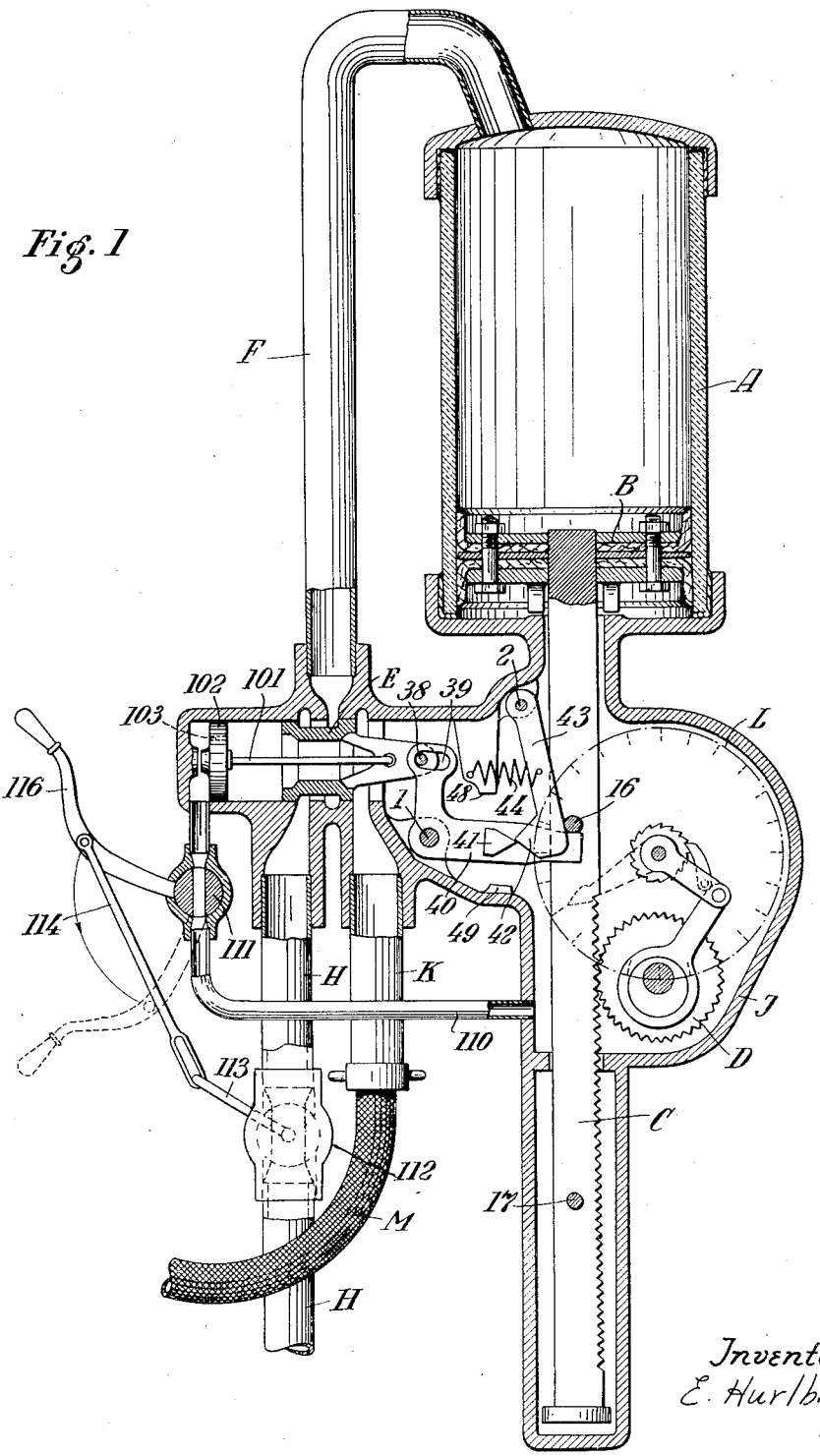
Fig. 1 shows one form of the invention, partly in vertical section, partly in elevation.

In the drawings A is the measuring cylinder, B the measuring piston which moves in the measuring cylinder and actuates by means of a rack C connected to it and a pinion D meshing with the teeth of the said rack, the drive for the counter L, indicated in dotted lines. J is a casing which is connected to the lower part of the cylinder A so as to be in constant communication therewith and which encloses both the piston rod C and its driving pinion D as well as the change-over member E and the operating mechanism thereof. The change-over member communicates through the interior of the casing J with the lower end of the cylinder and through the pipe F with the upper end of the cylinder. There are also connected to the casing of the change-over member the supply pipe H coming from the storage vessel for the liquid to be delivered and the pipe K which leads to the tapping hose M.

The liquid is supplied for instance by a pump not shown in the drawings, which is built into the supply pipe H, and moves the piston B upwards and downwards in the cylinder A. At the end of each stroke of the piston the change-over member E is automatically operated in such a manner that, if previously for instance the upper end of the cylinder was connected through the connecting pipe F with the supply pipe H and the lower cylinder end through the space in the casing J with the tapping pipe K, after the change-over the tapping pipe K will be connected with the upper end of the cylinder and the supply pipe H with the lower end, so that at each stroke of the piston liquid is introduced on one side of the piston by way of the pipe H and liquid is expelled on the other side of the piston by way of the pipe K. The quantity of liquid delivered is registered by means of the counting device L of a known kind which is driven by the pinion D and which counts the to and fro motions of the measuring piston and consequently the quantity of liquid driven out by the piston.

The drawings illustrate the position of the parts at the moment in which the piston B has reached a position immediately before the end of its downward stroke. The change-over member E which is constructed in the form of a tubular slide valve with a bore extending through it is connected by a bell crank 40 pivoted at 1 through the intermediary of a pin 38 which engages in a hole 39 in one arm of the bell crank 40, which hole is considerably larger than the pin, so that the slide E is carried along by the lever 40 during the to and fro motion of the lever, each time not immediately but only after the latter has performed an idle motion. On the other arm of the bell crank is a two-sided roof-shaped cam 41 which coacts with a similar cam 42 of a lever 43 which is pivoted at 2 and is acted on by the tension of a spring 44. The bell crank 40 is moved upwards and downwards at the end of each piston stroke by driving pins 16 and 17 and has its stroke limited by stops 48 and 49.

The slide E is connected by a spindle 101 with a disc or piston 102 which acts as a damping or retarding device. For this purpose it may be fitted with a certain amount of clearance in the part of the slide casing which guides it and/or be provided with a passage 103 extending through it.

The left hand part of the slide casing containing the disc or piston 102 is in communication with the interior of the casing C, through a by-pass conduit 110 said conduit having a closing member 111, preferably in the form of a cock, which, in the case shown in Fig. 1, may be coupled with a stop cock 112 provided in the supply pipe H, through the connection of the controlling lever 113 of the stop cock 112 with the control lever 116 of the by-pass cock 111 by a connecting rod 114 with lost motion. This lost motion is so determined and the controlling edges of the cocks 111 and 112 are so positioned that, when jointly operated, the by-pass cock 111 is first closed and only then on the controlling lever 116 being moved over further the stop cock 112.

Figure 2:
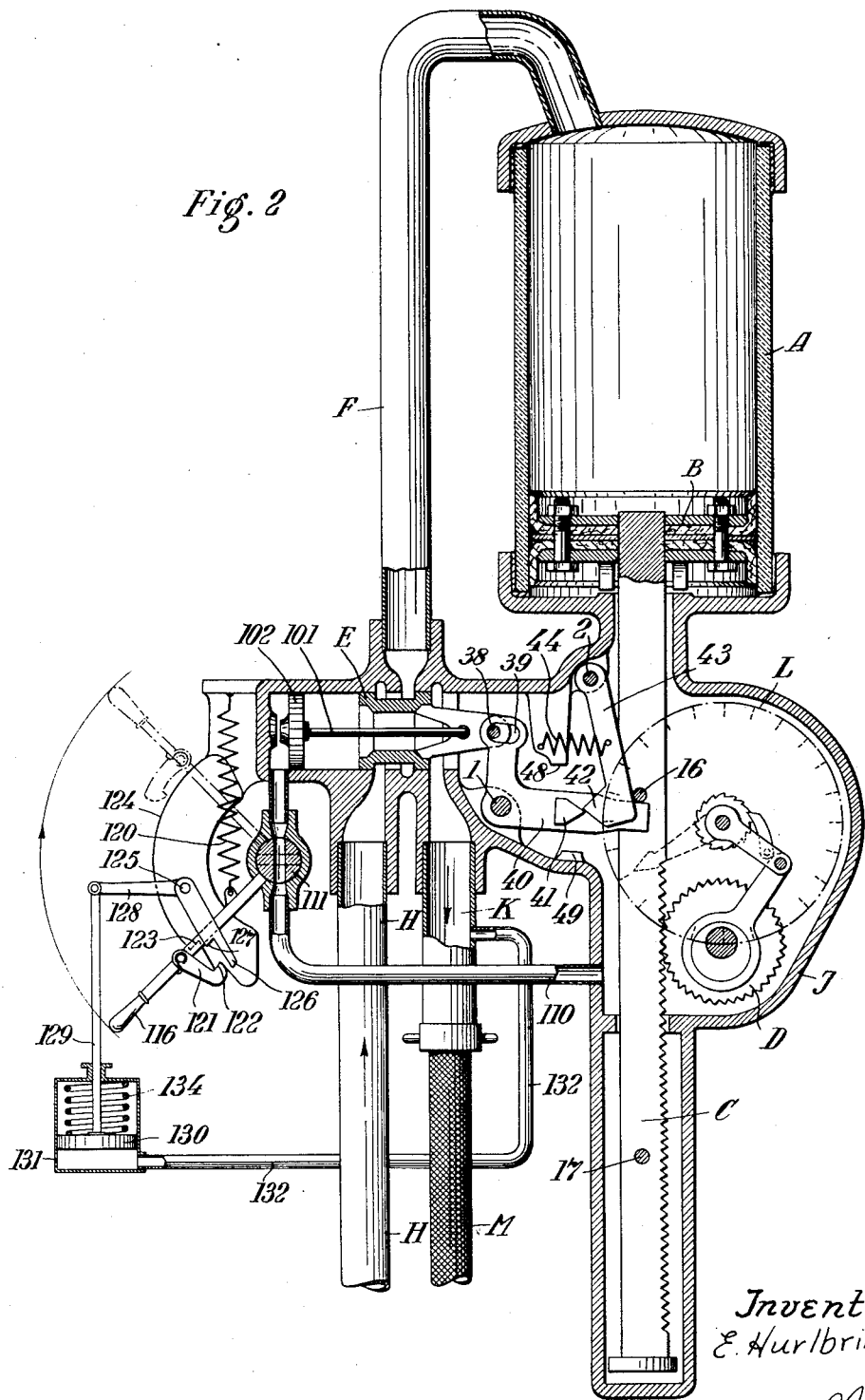
Fig. 2 is a similar view of a further constructional form.

In the constructional form shown in Fig. 2 the damper by-pass cock 111 is under the influence on the one hand of a spring 120 which tends to return it into the closed position and on the other hand under the influence of a detent 121 pivoted on a lever 116 secured to the cock 111, which detent holds the cock in the open position by engaging in one of the ratchet teeth 122, 123. These ratchet teeth are provided in a segment piece 124 having a pin 125 which forms the pivot of a disengaging member 126 having a tooth 127. The other arm 128 of the disengaging member is under the influence, through a spindle 129, of a piston 130 which slides in a cylinder 131 which is connected through a pipe 132 with the connecting pipe K of the tapping hose M. The piston 130 is under the influence of a pressure spring 134.

The apparatus shown in Fig. 1 operates as follows:

As long as a tapping operation in which the liquid is supplied through the pipe H for instance by means of a motor pump is not yet finished, the effectiveness of the damper disc 102 is greatly reduced through opening the cock 111. Consequently the change-over of the slide valve E takes place very rapidly under the action of the spring 44 and the reversal of the piston takes place each time without loss of time. As soon, however, as a tapping is to be terminated, the action of the damper disc can be greatly increased by closing the cock 111, so that the next time the piston comes to the end of a stroke the reversal of the slide valve E takes place very slowly, enabling the tapping operation to be interrupted and the pressure to drop before the reversal of the slide valve is finished. When the stop cock 112 of the supply pipe H is suitably coupled with the by-pass cock 111, as indicated above, the change-over of both cocks is effected in two part motions of the controlling lever 116 in such a manner that the first motion only closes the by-pass cock 111, while as soon as the piston B reaches the end of its stroke the second motion causes the stop cock 112 to close as well.

When the arrangement is that shown in Fig. 2 in which the return of the damper by-pass cock into the shut-off position is to take place under the influence of a spring automatically as soon as the pressure due to accumulation takes place in the hose pipe, it must be taken into consideration that with such an apparatus, for instance operated by motor pumps, there will only be one attendant who will first put the motor pump into operation, while the hose cock is still closed, and that the pump will immediately produce a pressure, as the hose cock for the time being still remains closed, until the attendant has inserted the hose nozzle into the tank which is to be filled and has opened the hose cock. When operating the apparatus in this way, at the beginning of a tapping operation the by-pass cock 111 is first opened by means of the lever 116 in opposition to the force of its spring 120, the detent 121 engaging in the tooth 122 of the segment 124. Thereupon the motor pump is started, while the hose cock is still closed, the result being that the pressure thus produced is transmitted by way of the pipe 132 to the piston 130 which in opposition to the force of its spring 134 disengages by means of the disengaging member 126 the detent 121 from the tooth 122, the detent being caught by the tooth 127 of the disengaging member 126 and preventing the cock 111 being returned into its closing position. As soon as the hose cock has been opened after the hose nozzle has been introduced into the tank to be filled, the measuring tapping operation will commence and the pressure produced in the tapping hose disappears, so that the piston 130 moving under the influence of its spring 134 draws back the disengaging member 126, the tooth 127 of which releases the detent 121 which will now, however, be caught by the second tooth 123, so that the return of the damper by-pass cock 111 into the closed position is still prevented. Only when, towards the end of the tapping operation, the hose cock is strongly throttled or temporarily completely closed, a fresh pressure will be produced in the tapping hose, which will affect the piston 131 in such a manner that by means of the disengaging member 126 it disengages the detent 121 from the tooth 123 and thereby brings about the immediate change-over of the damper by-pass cock 111 into the closed position. The result of this is that after the hose cock has been reopened, the measuring piston will finish its stroke but will then under the influence of the damping effect on the motion of the controlling valve, which is now very strong, make a short pause, causing the outflow of the liquid out of the tapping hose to be interrupted for the same period of time. This gives the attendant the opportunity of closing the tapping cock before the change over of the slide valve is finished or before a fresh piston stroke has commenced. In this way, therefore, the constructional form shown in Fig. 2 enables the attendant, as soon as a tapping operation is to be determined, to retard the next reversal in the motion of the piston at any moment by bringing the damper into operation, so as to be able to utilize the interruption in the outflow of the liquid thus produced for closing the hose cock before the piston again leaves the end of its stroke.

What I claim is:

1. Apparatus for delivering and measuring liquids, especially fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a delivery conduit for the liquid, a change-over member adapted to move in dependence on the movement of said piston and to thereby alternately establish communication between one of said connecting conduits and said supply conduit and between the other one of said connecting conduits and said delivery conduit and vice versa, means to retard the throw-over movement of said change-over member, and means to make said retarding means ineffective.

2. Apparatus for delivering and measuring liquids, especially fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a delivery conduit for the liquid, a change-over member adapted to move in dependence on the movement of said piston and to thereby alternately establish communication between one of said connecting conduits and said supply conduit and between the other one of said connecting conduits and said delivery conduit and vice versa, means to retard the throw-over movement of said change-over member, and means to automatically cause said retarding means to become ineffective in dependence on an increase of the fluid pressure within the delivery conduit.

3. Apparatus for delivering and measuring liquids, especially fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a delivery conduit for the liquid, a change-over member adapted to move in dependence on the movement of said piston and to thereby alternately establish communication between one of said connecting conduits and said supply conduit and between the other one of said connecting conduits and said delivery conduit and vice versa, means to retard the throw-over movement of said change-over member, and means to automatically cause said retarding means to become ineffective in dependence on a repeated increase of the fluid pressure within said delivery conduit interrupted by a diminution of said pressure.

4. Apparatus for delivering and measuring liquids, especially fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a delivery conduit for the liquid, a change-over member adapted to move in dependence on the movement of said piston and to thereby alternately establish communication between one of said connecting conduits and said supply conduit and between the other one of said connecting conduits and said delivery conduit and vice versa, hydraulic damper means operatively connected to said change-over member and adapted to retard its movement, said damper means comprising a casing and a piston member movable therein, a by-pass conduit adapted to establish communication between one side of said piston member and the other one, and means to shut off said by-pass conduit.

5. Apparatus for delivering and measuring liquids, especially fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a delivery conduit for the liquid, a change-over member adapted to move in dependence on the movement of said piston and to thereby alternately establish communication between one of said connecting conduits and said supply conduit and between the other one of said connecting conduits and said delivery conduit and vice versa, hydraulic damper means operatively connected to said change-over member and adapted to retard its movement, said damper means comprising a casing and a piston member movable therein, a by-pass conduit adapted to establish communication between one side of said piston member and the other one, and means to automatically shut off said by-pass conduit in dependence on a repeated increase of the fluid pressure within said delivery conduit.

6. Apparatus for delivering and measuring liquids, especially fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a delivery conduit for the liquid, a change-over member adapted to move in dependence on the movement of said piston and to thereby alternately establish communication between one of said connecting conduits and said supply conduit and between the other one of said connecting conduits and said delivery conduit and vice versa, hydraulic damper means operatively connected to said change-over member and adapted to retard its movement, said damper means comprising a casing and a piston member movable therein, a by-pass conduit adapted to establish communication between one side of said piston member and the other one, a member to shut off said by-pass conduit, and a member to shut off said supply conduit, means to operate one of said shut-off members in such a way that the first named shut-off member on being closed will reach its shut-off position earlier than said supply conduit shut-off member.

7. Apparatus for delivering and measuring liquids, especially fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a delivery conduit for the liquid, a change-over member adapted to move in dependence on the movement of said piston and to thereby alternately establish communication between one of said connecting conduits and said supply conduit and between the other one of said connecting conduits and said delivery conduit and vice versa, hydraulic damper means operatively connected to said change-over member and adapted to retard its movement, said damper means comprising a casing and a piston member movable therein, a by-pass conduit adapted to establish communication between one side of said piston member and the other one, a shut-off member within said by-pass conduit, resilient means tending to move said member into its shut-off position, locking means adapted to prevent said resilient means from doing so, and means operatively dependent on an increase of the fluid pressure within said delivery conduit to release said locking means.

8. Apparatus for delivering and measuring liquids, especially fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a delivery conduit for the liquid, a change-over member adapted to move in dependence on the movement of said piston and to thereby alternately establish communication between one of said connecting conduits and said supply conduit and between the other one of said connecting conduits and said delivery conduit and vice versa, hydraulic damper means operatively connected to said change-over member and adapted to retard its movement, said damper means comprising a casing and a piston member movable therein, a by-pass conduit adapted to establish communication between one side of said piston member and the other one, a shut-off valve within said by-pass conduit, resilient means tending to move said valve into its shut-off position, a detent member operatively connected to said valve and adapted to lock it in its open position, a disengaging member adapted to release said detent member on being operated in one sense and immediately to lock it again and then to release it again on being operated in another sense, a fixed catch member adapted to lock said detent member, and a pressure device operatively connected to said disengaging member and adapted to operate it in different senses, said pressure device being dependent in its operation on a repeated increase of fluid pressure within said delivery conduit.

9. Apparatus for delivering and measuring liquids, especially fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a delivery conduit for the liquid, a change-over member adapted to move in dependence on the movement of said piston and to thereby alternately establish communication between one of said connecting conduits and said supply conduit and between the other one of said connecting conduits and said delivery conduit and vice versa, hydraulic damper means operatively connected to said change-over member and adapted to retard its movement, said damper means comprising a casing and a piston member movable therein, a by-pass conduit adapted to establish communication between one side of said piston member and the other one, a shut-off valve within said by-pass conduit, resilient means tending to move said valve into its shut-off position, a detent member operatively connected to said valve and adapted to lock it in its open position, a disengaging member adapted to release said detent member on being operated in one sense and immediately to lock it again and then to release it again on being operated in another sense, a casing, a piston member movable within said casing and having a piston rod, said piston rod being operatively connected to said disengaging member, spring means adapted to move said piston member in one direction, and a conduit communicating said casing to said supply conduit.

10. Apparatus for delivering and measuring liquids, especially fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a delivery conduit for the liquid, a change-over member adapted to move in dependence on the movement of said piston and to thereby alternately establish communication between one of said connecting conduits and said supply conduit and between the other one of said connecting conduits and said delivery conduit and vice versa, hydraulic damper means operatively connected to said change-over member and adapted to retard its movement, said damper means comprising a casing and a piston member movable therein, a by-pass conduit adapted to establish communication between one side of said piston member and the other one, a shut-off valve within said by-pass conduit, resilient means tending to move said valve into its shut-off position, a lever to operate said valve, a detent member mounted on said operating lever and adapted to lock it in its open position, a disengaging member adapted to release said detent member on being operated in one sense and immediately to lock it again and then to release it again on being operated in another sense, two fixed catch teeth, adapted to lock said detent member in two different positions, a casing, a piston member movable within said casing and having a piston rod, said piston rod being operatively connected to said disengaging member, spring means adapted to move said piston member in one direction, and a conduit communicating said casing to said supply conduit.

ERNST HURLBRINK.